July 18, 1972  H. A. CLARK  3,677,859
METHOD FOR APPLICATION OF PRESSURE-SENSITIVE ADHESIVES
Filed Aug. 13, 1970
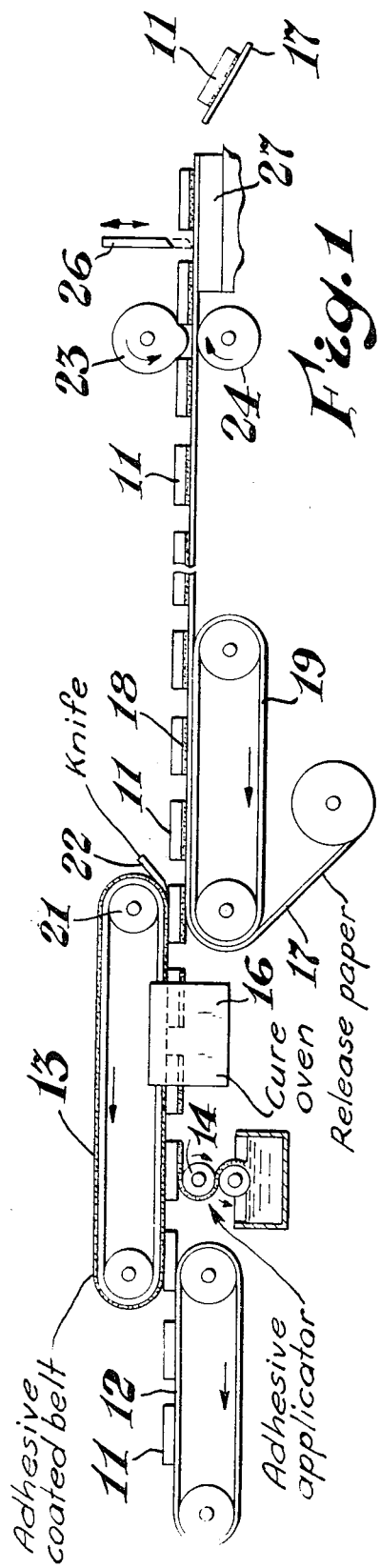
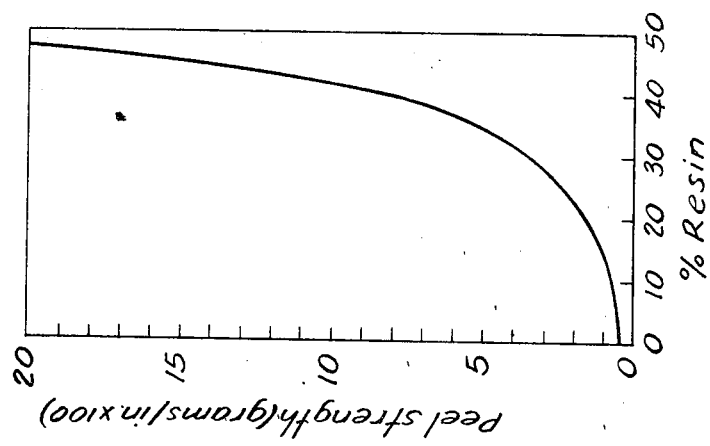
INVENTOR.
Harold A. Clark
BY
Howard W. Hermann
ATTORNEY

United States Patent Office 3,677,859
Patented July 18, 1972

---

3,677,859
METHOD FOR APPLICATION OF PRESSURE-SENSITIVE ADHESIVES
Harold A. Clark, 4107 Cruz St., Midland, Mich. 48640
Filed Aug. 13, 1970, Ser. No. 63,536
Int. Cl. B32b 31/00
U.S. Cl. 156—250
4 Claims

ABSTRACT OF THE DISCLOSURE

A pressure-sensitive adhesive backing is applied to articles by adhering the face of the articles to a belt coated with a pressure-sensitive adhesive. The belt passes through a curing oven and a backing sheet coated with a release coating is applied over the cured adhesive before release from the belt.

CROSS REFERENCES TO RELATED APPLICATIONS

The disclosure of U.S. Pat. No. 2,736,721 is incorporated herein by reference.

BACKGROUND OF THE INVENTION

The present invention relates to apparatus and methods for coating objects with pressure-sensitive adhesive materials.

It has long been known that pressure-sensitive adhesives may be applied to tapes and other webs of sheet material. In more recent years pressure-sensitive adhesives have been applied to the backs of various objects such as, for example, floor tiles and the like.

Numerous types of pressure-sensitive adhesives suitable for adhering virtually any material to any substrate have been developed. For example, it is known that silicone adhesives such as those described in U.S. Pat. No. 2,736,721 can be utilized to bond metals and plastics. These materials have, however, failed to find widespread use because of the difficulty in applying the adhesive coating to the backs of objects having substantial thickness, except by hand.

SUMMARY OF THE INVENTION

It is, therefore, an object of the present invention to provide a method and apparatus for automatic coating of the backs of various discrete objects with a pressure-sensitive adhesive or other adhesive coating.

In accordance with this and other objects, there is provided by the present invention the method and apparatus whereby the discrete articles to be coated are carried face-up into contact with a pressure-sensitive adhesive coated belt where they are adhered. The articles are then carried by the belt past an adhesive applicator station which applies an uncured adhesive material to the backs of the articles. The belt then carries the articles through a curing station and then to a point at which a protective backing material carrying a release coating is adhered to the adhesive coated backs of the articles.

This system provides for the automatic processing of discrete articles which may be of almost any desired shape with an absolute minimum amount of labor required. With this system, high-strength adhesives may be applied, for example, to metal trim which is designed to be adhered to automobiles, home appliances or other devices. By appropriate blending of materials the conveyor belt can be designed for optimum processing, depending upon the size, shape and material of the articles being processed.

BRIEF DESCRIPTION OF THE DRAWING

Other objects and attendant advantages of the present invention will become obvious to those skilled in the art from a consideration of the following detailed description when read in connection with the accompanying drawing, wherein:

FIG. 1 is a schematic diagram illustrating the method and apparatus of the present invention; and FIG. 2 is a curve showing preferred adhesive formulations versus strength.

DESCRIPTIONS OF PREFERRED EMBODIMENTS

Referring now to the drawing wherein like parts carry like reference numerals, there is shown a plurality of articles 11, being carried into the coating apparatus by means of a first conveyor 12. The articles may be of any desired shape and of any desired material suitable for application by use of adhesive materials. The articles 11 are carried on the conveyor 12 with the backs of the articles, i.e., that surface of each article which is to be coated with adhesive, in contact with the conveyor 12. The face of the article, i.e., the surface of the article which is not to be coated with adhesive and which is opposite the side which is to be coated, faces away from the conveyor belt 12.

A second conveyor means 13, which is itself coated with a cured pressure-sensitive adhesive, has one end thereof positioned opposite the end of the first conveyor means 12 and spaced therefrom a distance approximately equal to the thickness of the article 11 to be coated. The spacing is chosen such that the space is a sufficient distance to allow the faces of the articles carried by the first conveyor means to be urged into contact with the pressure-sensitive adhesive on the belt 13 whereby the face is adhered to the belt and the articles are carried along the lower reach thereof.

The belt 13 carrying the articles 11 thereon next passes an adhesive applicator 14, which may be, for example, of the conventional roll coating type. The adhesive applicator 14 is also spaced from the belt 13 by a distance approximately equal to the thickness of the articles 11 being coated. The applicator contacts the back faces of the articles 11, which are exposed after the articles leave the surface of the first conveyor means 12. In accordance with common practice in the art, the applicator 14 may contact the entire surface of the articles 11 or may contact only portions thereof to provide strips of liquid adhesive material on the article surface.

After the articles are coated, the belt 13 continues carrying the articles through a curing station which may be for example, an oven 16 to cure the liquid adhesive on the back surfaces of the articles 11. If the adhesive is of the room temperature curing type, the only curing station need is a sufficient length of belt to provide for solvent removal. Even in such cases, the use of slightly elevated temperatures is often helpful in expediting the cure.

Conventionally, a protective backing sheet having a release coating on the surface thereof is applied to pressure-sensitive adhesive coated surfaces to protect the same until the adhesive is to be applied for bonding purposes to another surface. As shown in the drawing, a supply reel 17 of release paper having a suitable release coating thereon is fed into contact with the adhesive coated articles 11 by means of a roller or the like 18 which may, if desired, carry a third conveyor means 19 thereover. As the articles 11 reach the end of the lower reach of the belt 13, the articles are stripped along with the backing sheet of release paper 17 from the belt 13. This may be done, for example, simply by using a relatively small diameter roller 21 at the end of the belt 13 whereby the belt circumference as it goes around the roller 21 causes the article 11 to separate from the belt 13. It is desirable, however, to include separating means such as a knife edge 22 to insure separation of the article 11 from the belt 13 at this point.

The articles 11 with the adhesive backing and protective sheet affixed thereto continue along the reach of the third conveyor means 19. If desired, the material can simply be reeled as it leaves the end of conveyor 19 until use. Alternatively, the articles 11 may be separated as they leave the belt 19 by feeding the web of release paper 17 with the articles 11 thereon, such as by use of a pair of rollers 23 and 24 past a severing means 26 operating against an anvil 27. The severed articles 11 with the pieces of the protective release coated sheet 17 may be simply stacked and packaged for shipment to the point of use of the articles.

The pressure-sensitive adhesive on the belt 13, can be any pressure-sensitive adhesive known in the art but must be chosen according to the materials of the articles 11 which are to be transported by the belt 13. The weight of the articles 11 and the face surface area of these articles which will be in contact with the belt 13 must also be taken into consideration in the choice of adhesives for the belt. The adhesive must necessarily be of sufficient strength to carry the articles along the lower reach of the belt, but should allow a relatively easy release of the materials as the belt 13 passes around the end roller 21.

The preferred materials for use in coating the belt 13 are silicone adhesives of the type described in the aforementioned Pat. 2,736,721. As shown in FIG. 2 these materials may be formulated according to the examples shown in the patent to provide the desired release properties. The curve shown in FIG. 2 of the drawing was developed using the siloxane resin of Example 1 of the aforementioned patent together with the dimethylsiloxane polymer gum of Example 2 of the patent, formulated 40 weight percent solids in a xylene solution with 1% benzoylperoxide added based on solids. Then benzoylperoxide acts as a curing agent for the material. The material in each case was cast on a 3 mil thick aluminum sheet to give a cured coating thickness of 5 mils. The adhesion peel strength was tested against stainless steel. Obviously, if other materials were to be used for the belt or the articles 11, different adhesive strengths would be obtained. However, a similar curve could be developed for any given pair of materials by using the same procedure.

The adhesive strength was measured directly in grams/inch by 180 degree stripping at a constant speed of 12 inches/minute using one inch wide material in a Keil tester. The adhesive peel strength is plotted in FIG. 2 directly in grams/inch width times 100 and the percent resin is based on solids only, rather than on percentage of xylene solution. It should be understood, of course, that while xylene is mentioned, any of the other solvents mentioned in the aforementioned patent application are also useable.

As an example, looking at the curve in FIG. 2, a formulation with 30% resin, and 70% siloxane gum will give approximately 350 grams/inch adhesive strength. Similarly, a formulation containing 15% resin solids and 85% gum solids will give a peel strength of approximately 120 grams/inch. Thus, suitable formulations for coating the belt 13 can be chosen depending upon the weight of the article to be transported by the belt and its surface area in contact with the belt.

Obviously, other variations and modifications of the present invention will occur to those skilled in the art from a consideration of the foregoing. It is, therefore, to be understood that within the scope of the appended claims the invention may be practiced otherwise than as specifically described.

That which is claimed is:

1. Apparatus for applying adhesive to the backs of articles, comprising:
    a first conveyor means for conveying articles face-up,
    a second conveyor means comprising a belt coated with pressure-sensitive adhesive having one end thereof positioned opposite said first conveyor means and spaced therefrom a sufficient distance to allow the faces of articles carried by said first conveyor means to be urged into contact with the pressure-sensitive adhesive on said belt whereby said faces adhere to said belt and the articles are carried along a reach thereof;
    an adhesive applicator positioned in spaced relationship to said reach of said belt for contacting the backs of said articles as they progress along said second conveyor and applying uncured adhesive material thereto;
    a curing station through which said reach of said second conveyor passes after passing said applicator to cure the adhesive material applied to said article backs; and
    means for supplying protective backing sheet material coated with a release coating to said article backs.

2. Apparatus as defined in claim 1 and further including means for stripping said articles from said second conveyor means after said backing sheet material has been applied.

3. Apparatus as defined in claim 1 and further including third conveyor means having one end thereof positioned adjacent said second conveyor means for receiving articles therefrom.

4. Apparatus as defined in claim 3 and further including cutting means for severing said backing sheet material to separate said articles after the articles leave said second conveyor means.

References Cited

UNITED STATES PATENTS

| | | | |
|---|---|---|---|
| 3,415,705 | 12/1968 | Ettre | 156—540 |
| 3,155,558 | 11/1964 | Clapp | 156—552 X |
| 3,340,125 | 9/1967 | Drenning et al. | 156—499 X |
| 3,583,889 | 6/1971 | Califano et al. | 156—250 |

BENJAMIN A. BORCHELT, Primary Examiner

D. BENT, Assistant Examiner

U.S. Cl. X.R.

156—499